(12) United States Patent
Kowatari et al.

(10) Patent No.: US 6,386,182 B2
(45) Date of Patent: May 14, 2002

(54) METHOD AND APPARATUS FOR CONTROLLING INTAKE AIR FLOW RATE OF AN ENGINE AND METHOD FOR CONTROLLING OUTPUT

(75) Inventors: Takehiko Kowatari, Kashiwa; Yuzo Kadomukai, Ishioka; Toshihiro Aono; Toshifumi Usui, both of Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/764,463

(22) Filed: Jan. 19, 2001

Related U.S. Application Data

(62) Division of application No. 09/397,855, filed on Sep. 17, 1999, now Pat. No. 6,199,537.

(30) Foreign Application Priority Data

Sep. 18, 1998 (JP) ............................................ 10-264927

(51) Int. Cl.[7] .............................. F02D 9/02; F02D 11/10
(52) U.S. Cl. ...................................................... 123/399
(58) Field of Search ................................ 123/361, 399, 123/494; 73/118.2

(56) References Cited

U.S. PATENT DOCUMENTS

| | | | |
|---|---|---|---|
| 4,168,679 A | 9/1979 | Ikeura et al. | 123/399 X |
| 4,418,673 A | 12/1983 | Tominari et al. | 123/478 |
| 4,471,741 A | 9/1984 | Asik et al. | 123/399 |
| 4,524,745 A | 6/1985 | Tominari et al. | 123/399 X |
| 4,590,912 A | 5/1986 | Atago | 123/478 |
| 4,640,243 A | 2/1987 | Abo et al. | 123/399 |
| 4,727,838 A | 3/1988 | Oshiage et al. | 123/361 |
| 4,771,752 A | 9/1988 | Nishimura et al. | 123/399 X |
| 5,642,708 A | 7/1997 | Heinrich et al. | 123/357 |
| 5,718,202 A * | 2/1998 | Bentz et al. | 123/399 |
| 6,014,955 A | 1/2000 | Hosotani et al. | 123/399 |
| 6,032,656 A | 3/2000 | Itoyama et al. | 123/568.21 |

FOREIGN PATENT DOCUMENTS

| | | | |
|---|---|---|---|
| DE | 42 15 107 | 1/1994 | |
| JP | 59-196936 | * 11/1984 | 123/361 |
| JP | 62-195446 | 8/1987 | |
| JP | 2-104930 | 4/1990 | |
| JP | 4-134136 | 5/1992 | |

* cited by examiner

*Primary Examiner*—Tony M. Argenbright
(74) *Attorney, Agent, or Firm*—Mattingly, Stanger & Malur, P.C.

(57) ABSTRACT

A device for controlling the flow of intake air to an engine includes an air flow meter for detecting the flow rate of air, an electronically controlled throttle for opening and closing a throttle valve, and an electric motor that drives the throttle valve via a gear. The air flow meter and electric motor are arranged on opposite respective sides of a plane that include an axis of the throttle valve and that extends in a direction of the flow of intake air in the engine.

3 Claims, 11 Drawing Sheets

METHOD AND APPARATUS FOR CONTROLLING INTAKE AIR FLOW RATE OF AN ENGINE AND METHOD FOR CONTROLLING OUTPUT

This is a divisional application of U.S. Ser. No. 09/397,855, filed Sep. 17, 1999, now U.S. Pat. No. 6,199,537.

BACKGROUND OF THE INVENTION

The present invention relates to an accurate method and apparatus for controlling the flow rate of intake air of an engine.

There are two general types of methods for controlling fuel injection type engines. One is the air-first control system in which air taken into the cylinders of an engine (hereinafter referred to as "engine intake air flow rate. The result of measurement by an air flow meter provided in a intake pipe is simply referred to as "air flow rate") is measured and then the fuel is injected in an amount in accordance with the engine intake air flow rate. The other is the fuel-first control system in which an amount of fuel is defined in advance and an engine intake air flow rate in accordance with the same is supplied to the engine.

In either of the systems, it is important to achieve an air fuel ratio that realizes a state of combustion desirable for reduction of harmful components in exhaust gas and reduction of the amount of fuel consumption.

Referring to the air-first control system, methods for controlling an internal combustion engine aimed at maintaining an air fuel ratio accurately during a transient time are disclosed in, for example, Japanese patent Application Laid-Open 104930/1990 (hereinafter "first prior art") and Japanese patent Application Laid-Open 134136/1992 (hereinafter "second prior art").

In the first prior art, a technique is disclosed in which an amount of fuel injection is determined by calculating a flow rate of intake air to an engine in accordance with a model of a intake pipe. In this case, a delay in an engine intake air flow rate at the time of a movement of a throttle valve caused by an accelerator pedal is calculated using pressure and engine speed information, and the amount of fuel injection is corrected in association with the delay of air. Since this method has had a problem in that amount for fuel correction is slow because the correction is calculated after a change in the opening of the throttle valve occurs, the second prior art provides a fuel injection controller by introducing a delay to the opening of the throttle valve relative to an acceleration pedal stepping-on amount to reduce the effect of the correction delay.

SUMMARY OF THE INVENTION

However, both of the conventional techniques are intended for the air-first control system and have the following problems when used for engines utilizing the fuel-first type control, e.g., direct injection in cylinder engines (hereinafter referred to "DI engines" which imply both of spark ignition type and compression ignition type DI engines). In a DI engine, as its name implies, fuel is directly injected into the combustion chamber of the engine. It is therefore an engine convenient for fuel-first type control because an amount of fuel to be used for one cycle of combustion can be supplied each time. However, since the conventional technique is intended for the air-first type control system, there is a need for an apparatus and a method which can freely control the intake air flow rate of an engine for engines utilizing the fuel-first type control.

In the case of air-first control, the output of an engine is changed through a long process that starts with the changing of the opening of the throttle valve followed by a change in the pressure in the intake pipe, a change in the amount of engine intake air, the changing of the fuel flow rate in accordance with the air flow rate and an increase or decrease in the engine output. Since the output of an engine is mainly proportionate to the amount of fuel injection, such control can result in poor engine response because the amount of fuel injection must be changed after the engine intake air flow rate is changed even when the output is to be increased or decreased in a short period. This problem has not been regarded as a significant problem in conventional single point injection (SPI) systems in which fuel is injected upstream of the intake pipe (upstream of the throttle valve) and multi-point injection (MPI) systems in which fuel is injected into a manifold because the time for fuel to reach the combustion chamber of the engine is similar to the time for engine intake air from rate to change, which problem has been difficult to solve.

In the case of a DI engine, however, since it can supply an amount of fuel with better response to a delay of air compared to an SPI or MPI engine, the air-first type control system hinders the improvement of response because of the delay of air in one aspect thereof. While this can be solved by employing the fuel-first type control system, no controller and method have been provided which cause an air flow rate to follow up an amount of fuel injection with high accuracy.

Meanwhile, from the viewpoint of improved safety of automobiles, vehicle movement controlling techniques have been developed such as traction control to prevent slipping of wheels by adjusting engine output, and intelligent cruise control for preventing a collision with a car in front by adjusting engine output. Further, engine output is sometimes controlled in accordance with a gear change for automatic transmission, and engine output control at high speed and with high accuracy is required for such vehicle movement control.

Further, recent environmental regulations permit no increase in harmful components in exhaust gas attributable to fluctuation of an air fuel ratio, which has resulted in a need for reducing fluctuation of an air fuel ratio during acceleration and deceleration. This has resulted in a need for a method and an apparatus for controlling not only fuel but also an engine intake air flow rate.

The output of an engine is directly affected by the amount of fuel which is a source of thermal energy. That is, the output of an engine is determined by the amount of fuel. In the conventional techniques intended for the air-first control, the output of an engine has been indirectly adjusted with air flow rate. Therefore, accurate adjustment of engine output has involved repeated operations of varying the air flow rate first, injecting fuel in accordance therewith, observing the output and appropriately varying the air flow rate again in the case of an excess of shortage, and this has made it difficult to control the output accurately. In the case of a fuel-first control type engine, since the amount of fuel which determines the output is first determined, the engine output can be controlled with high accuracy only by controlling the intake air flow rate of the engine. However, no apparatus and method have been provided which transiently control the intake air flow rate of an engine with high accuracy.

It is an object of the present invention to provide an apparatus and a method for controlling engine intake air and a method for controlling output in which in order to control the output of an engine with high accuracy, when the intake air flow rate of the engine is determined (i.e., the output is determined) in accordance with the amount of fuel, an actual engine intake air flow rate is supplied accurately in accordance therewith.

In order to solve the above problems, there is provided an air flow rate controller which has an air flow rate detecting device for detecting an air flow rate, a throttle valve opening/closing device for opening and closing a throttle valve, and a calculating device to which the detection value of the air flow rate detecting device, the position of the throttle valve, the engine speed and a target engine intake air flow rate are input and in that the calculating device drives the throttle valve opening/closing device in advance such that the engine intake air flow rate agrees with the target engine intake air flow rate.

There is also provided a method for controlling engine intake air flow rate in which a time constant of a delay of response of the air flow rate is calculated and the throttle valve is controlled such that a delay of the engine intake air flow rate is corrected based on the calculated time constant to cause the engine intake air flow rate to follow up the target engine intake air flow rate.

The present invention specifically provides the methods and apparatuses described below.

The present invention provides a method for controlling the flow rate of intake air to an engine by controlling the opening of an electronically controlled throttle, in which a command value for the flow rate of intake air to the engine is calculated from a throttle position signal of the electronically controlled throttle provided in a intake pipe, an air flow rate signal detected by an air flow rate meter provided upstream of the electronically controlled throttle and an engine speed signal and in which a target engine intake air flow rate is calculated by finding an over-shooting amount for said electronically controlled throttle valve.

The present invention further provides a method for controlling the flow rate of intake air to an engine including an over-shooting operation in which a throttle position signal from the electronically controlled throttle, the signal of the air flow rate meter, the engine speed signal and the target engine intake air flow rate to be taken into the cylinders of the engine are input to a calculating device and in which the calculating device determines a time constant of a delay of response, calculates a target signal for an air flow rate meter for compensating for the delay of response based on the determined time constant of the delay of response and drives the electronically controlled throttle such that the signal of the air flow rate meter agrees with the target signal.

The present invention provides a method for controlling the flow rate of intake air to an engine by controlling the opening of an electronically controlled throttle, in which an engine intake air flow rate is obtained from a throttle valve position signal, an air flow rate signal of air flowing through a suction pipe and an engine speed signal; an intake air flow rate command value is calculated in accordance with an amount of fuel injection determined based on said intake air flow rate; a throttle valve position signal is obtained by adding an over-shooting amount to said intake air flow rate command value; and said calculation is repeated by obtaining an engine intake air flow rate from the throttle valve position signal, air flow rate signal and the engine speed signal.

The present invention further provides a method for controlling the flow rate of intake air to an engine in which said over-shooting amount is a compensating (correcting) value determined in advance for the delay of change of the intake air flow rate relative to the operation of the electronically controlled throttle.

The present invention provides a method for controlling the flow rate of intake air to an engine by controlling the opening of an electronically controlled throttle, in which an exhaust gas recirculation flow rate of exhaust gas recirculation for introducing the exhaust gas of the engine into a suction pipe is obtained based on a throttle valve position signal, an air flow rate signal of air flowing through the suction pipe and an engine speed signal; a position signal of an EGR valve is obtained by adding an over-shooting amount to a value corresponding to said exhaust gas recirculation flow rate; and said calculation is repeated by obtaining an exhaust gas recirculation flow rate from said throttle valve position signal, air flow rate signal and engine speed signal.

The present invention provides a method for controlling the flow rate of intake air to an engine having an electronically controlled throttle provided in a suction pipe for introducing air in the internal combustion engine for controlling air flow rate, an air flow rate meter provided upstream of the electronically controlled throttle for detecting the air flow rate, an engine speed meter for detecting engine speed, a calculating device and an EGR valve for an exhaust gas recirculation device for introducing exhaust gas from the internal combustion engine into the suction pipe, in which a throttle position signal from the electronically controlled throttle, an air flow rate meter signal, an engine speed signal, the flow rate of intake air to be taken into the cylinders of the engine and the flow rate of the exhaust gas to be taken into the cylinder of the engine are input to the calculating device; the calculating device determines a time constant for a first delay of response, calculates a target signal for the air flow rate meter to compensate for the delay of response based on the determined time constant for the first delay of response and drives the electronically controlled throttle such that the signal from the air flow rate meter agrees with the target signal; and the calculating device determines a time constant for a second delay of response and drives the EGR valve based on the determined time constant for the second delay of response to compensate for the delay of response of the exhaust gas that flows into the engine.

The present invention provides a device for controlling the flow rate of intake air to an engine having an electronically controlled throttle provided in a suction pipe for introducing air in the engine for controlling air flow rate, an air flow rate meter provided sequence of the electronically controlled throttle valve for detecting the air flow rate and an engine speed meter for detecting engine speed, having a configuration including a calculating device which obtains the flow rate of intake air to the engine from a throttle valve position signal, an air flow rate signal and an engine speed signal, calculates an intake air flow rate command value based on said intake air flow rate, obtains a throttle valve position signal by adding an over-shooting amount to said intake air flow rate command value and repeats said calculation by obtaining an engine intake flow rate from the throttle valve position signal, the air flow rate signal and engine speed signal.

The present invention provides a device for controlling the flow rate of intake air to an engine having an electronically controlled throttle provided in a suction pipe for introducing air in the engine for controlling air flow rate, an air flow rate meter provided upstream of the electronically controlled throttle valve for detecting the air flow rate and an engine speed meter for detecting engine speed, having a configuration including a calculating device which obtains a flow rate of intake air to the engine from a throttle valve position signal, an air flow rate signal and an engine speed signal, obtains an amount of fuel injection from said engine intake air flow rate, calculates an intake air flow rate command value in accordance with said amount of fuel injection, obtains a throttle valve position signal by adding an over-shooting amount to said intake air flow rate command value and repeats said calculation by obtaining an engine intake flow rate from the throttle valve position signal, the air flow rate signal and engine speed signal.

The present invention provides a device for controlling the flow rate of intake air to an engine having an electronically controlled throttle provided in a suction pipe for introducing air in the engine for controlling air flow rate, an air flow rate meter provided upstream of the electronically controlled throttle for detecting the air flow rate, an engine speed meter for detecting engine speed, a calculating device and an EGR valve for an exhaust gas recirculation device for introducing exhaust gas from the engine into the suction pipe, having a configuration including a calculating device to which a throttle position signal from the electronically controlled throttle, an air flow rate meter signal, an engine speed signal, the flow rate of intake air to be taken into the cylinders of the engine and the flow rate of the exhaust gas to be taken into the cylinder of the engine are input, in which the calculating device determines a time constant for a first delay of response, calculates a target signal for the air flow rate meter to compensate for the delay of response based on the determined time constant for the first delay of response and drives the electronically controlled throttle such that the signal from the air flow rate meter agrees with the target signal and in which the calculating device determines a time constant for a second delay of response and drives the EGR valve based on the determined time constant for the second delay of response to compensate for the delay of response of the exhaust gas that flow into the engine.

The present invention provides a method for controlling the output of an engine in which output required for an engine is controlled by a command from an acceleration pedal, in which the torque of an engine is controlled by determining an amount of fuel injection in advance based on an intake air flow rate obtained in a calculating portion, then determining an intake air flow rate command value based on said amount of fuel injection, and determining a target intake air flow rate by adding an over-shooting amount transiently to said intake air flow rate command value to control the opening of an electronically controlled throttle.

According to the invention, once a target engine intake air flow rate is given, a controller predicts the engine intake air flow rate and controls the opening of a throttle valve such to achieve the best approximation of the target engine intake air flow rate. Further, when a target engine intake EGR flow rate is given, an EGR valve is driven such that the EGR valve also achieves the target intake EGR flow rate. As a result, an actual engine intake air flow rate can quickly and accurately reach the target. It is therefore possible to obtain an intake air flow rate which is preferably used in a fuel-first control engine.

This also makes it possible to control the output of an engine taking advantage of the fuel-first type control system.

DESCRIPTION OF THE PREFERRED EMBODIMENTS

Figure 1:
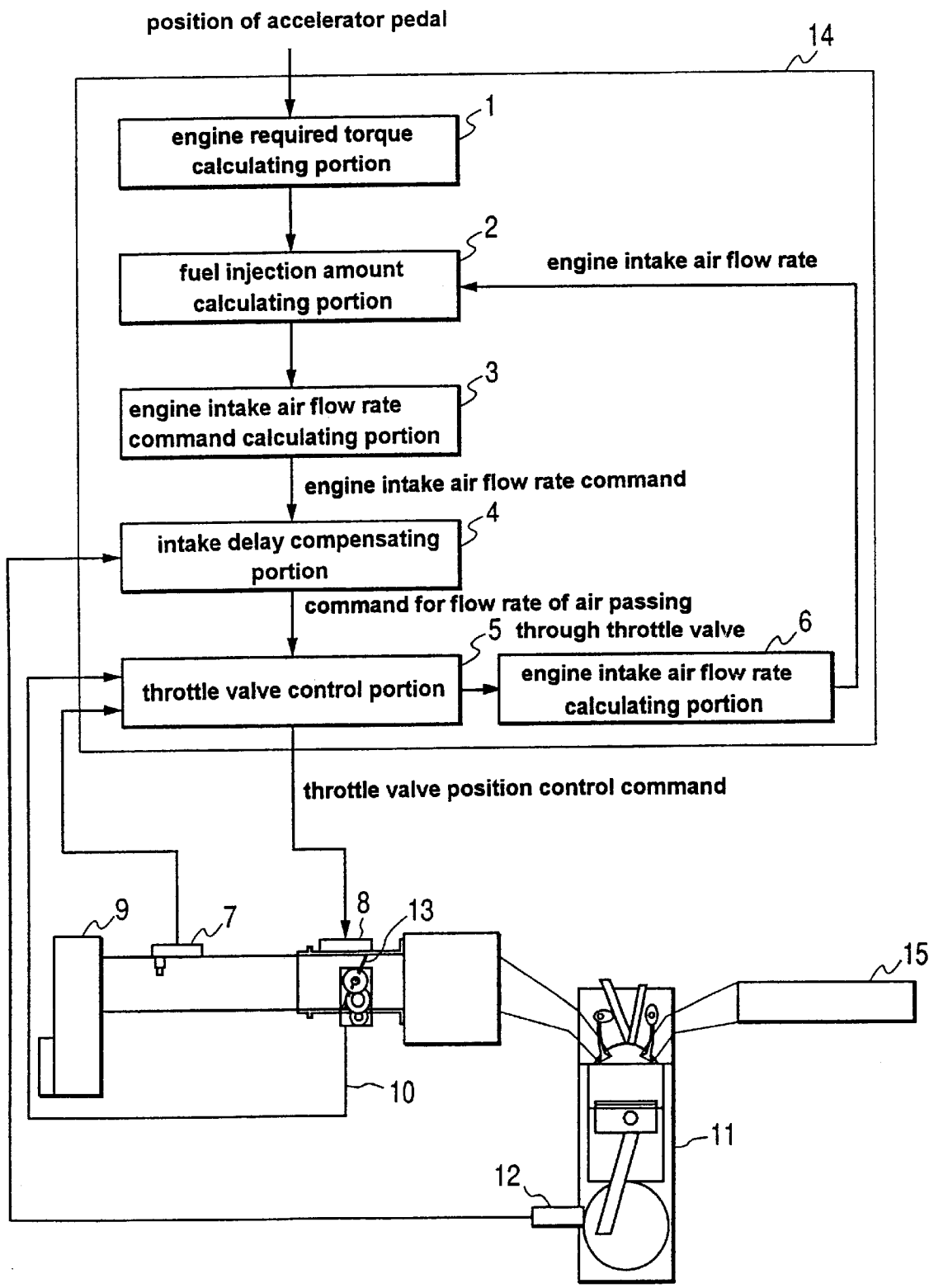
FIG. 1 is a diagram showing a method of control as a whole.

An embodiment of a controller and a control method according to the present invention will now be described using FIG. 1. The configuration will be described first. Air taken into an engine 11 passes an air cleaner 9 and passes a throttle valve 13 to be taken into the engine 11. Exhaust gas from the engine 11 is released to the atmosphere through an exhaust pipe 15. The throttle valve 13 is a part of an electronically controlled throttle 8 and is driven by an electric motor. The opening of the throttle valve 13 is detected by an throttle position sensor which is not shown. An air flow meter 7 is positioned between the throttle valve 13 and the air cleaner 9 to measure the air flow rate in the position of the air flow rate meter 7. In the embodiment, a hot wire type air flow meter was used as the air flow rate meter. The engine speed of the engine 11 is determined based on a signal detected by a crank angle sensor 12.

Algorithm for the controller will now be described. When a driver operates on the accelerator pedal, a signal from an accelerator pedal position sensor which is not shown is taken into a block 1 to calculate the torque (output) required for the engine. Required information on the torque from other sensors which are not shown, e.g., engine required torque for traction control, is also input to the block 1 to be included in the calculation of the required engine torque. A block 2 calculates an amount of fuel injection based on the engine required torque calculated in the block 1 and outputs a fuel injection amount signal to an injector control portion for injecting fuel which is not shown. A block 3 calculates the flow rate of intake air to be taken into cylinders of the engine based on the amount of fuel injection calculated in the block 2 and outputs it as an engine intake air flow rate command. A block 4 calculates the engine speed of the engine 11 obtained by the crank angle sensor 12 and determines a time constant for a delay of the engine intake air flow rate relative to the flow rate of the air passing through the throttle valve based on the engine speed. Once the time constant of delay is determined, a flow rate of air passing through the throttle valve required to reach the engine intake air flow rate command is calculated using an inverse function of a transfer function representing a change in the intake air flow rate of the engine from a change in the throttle valve opening. A block 5 calculates a throttle valve opening that results in the flow rate of the air passing through the throttle valve as calculated in the block 4 based on a signal output by the air flow rate meter 7 and a throttle valve opening signal 10 outputted from the throttle position sensor. The block 5 further controls the opening of the electronically controlled throttle 8 such that the calculated throttle valve opening is achieved.

Figure 2:
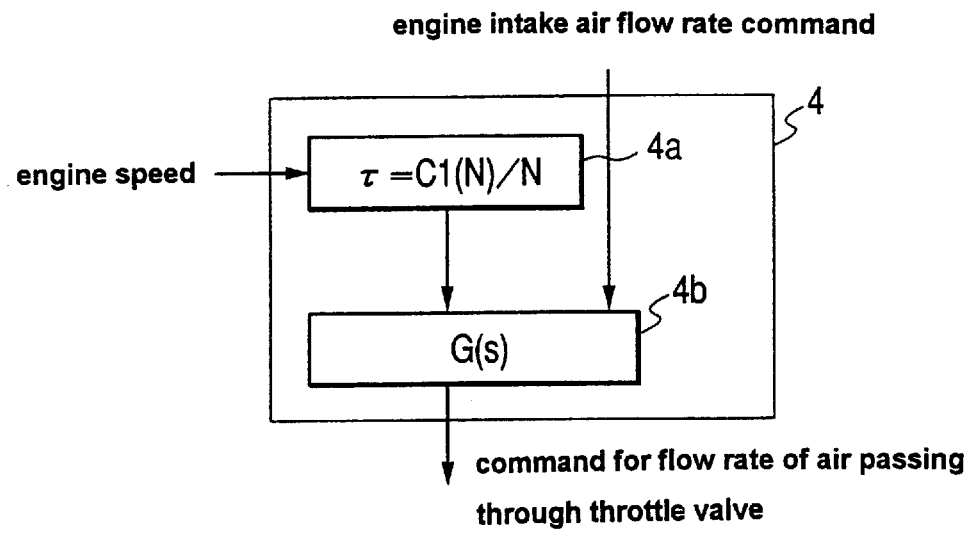
FIG. 2 is a diagram showing a method for compensating for a delay in suction.

The operation of the block 4 will be described further using FIG. 2. Engine speed information obtained by the crank angle sensor 12 is input in the a block 4a which calculates a time constant ($\tau$) of delay. This time constant depends on the capacity of the intake pipe downstream of the throttle valve and the engine speed (N). Specifically, it can be calculated using Equation 1.

$$\tau = C1(N)/N \quad \text{(Equation 1)}$$

N represents the engine speed and C1 represents a coefficient.

The coefficient C1 is a function of N and can be approximated using a quadratic of N expressed by Equation 2.

$$C1(N) = a2 \cdot N^2 + a1 \cdot N + a0 \quad \text{(Equation 2)}$$

a0–a2 are constants which are empirically defined.

When it is desired to reduce the burden on the calculating device, C1 may be stored as a map of N to allow reference to C1.

Next, a block 4b uses the time constant of delay ($\tau$) to filter the engine intake air flow rate command with the following transfer function, and this provides a command for the flow rate of air passing through the throttle valve. Equation 3 shows the function for filtering.

$$G(s) = (\tau s + 1)/(c2s + 1) \quad \text{(Equation 3)}$$

C2 is a coefficient, and s is a Laplace operator. While C2 may be empirically defined, it should be preferably equal to or smaller than 1/10 of $\tau$. The result of the calculation in the block 4b is sent to the block 5.

Figure 3:
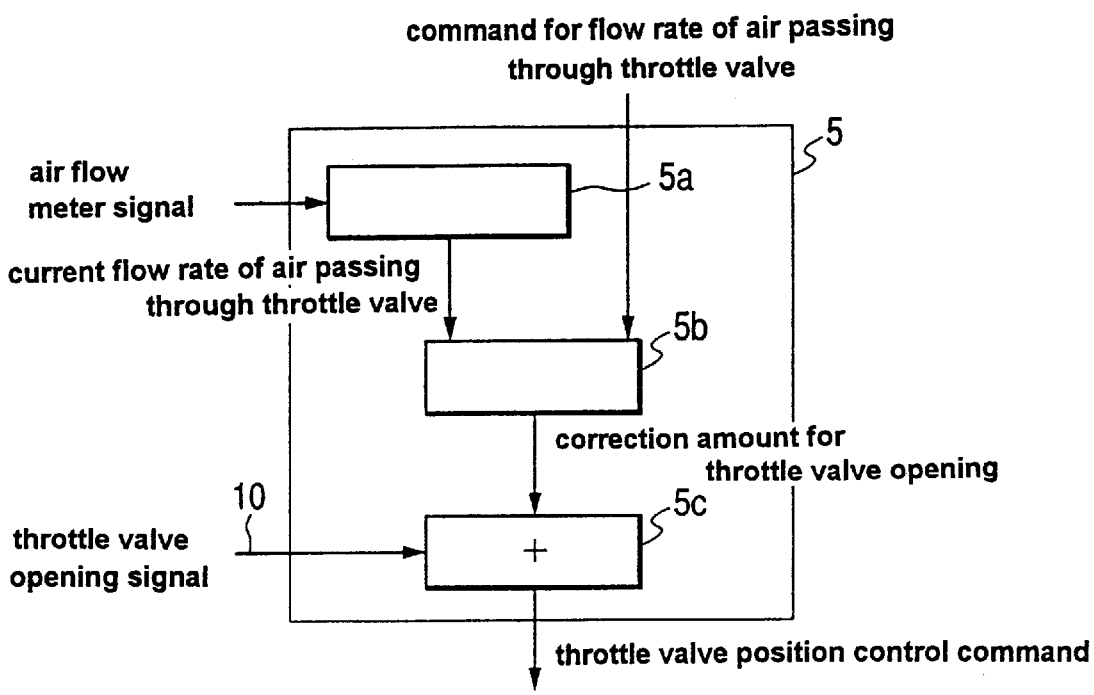
FIG. 3 is a diagram showing a method for obtaining a target position of a throttle valve.

The block 5 will be described in detail using FIG. 3. The air flow rate signal from the air flow meter 7 is input to the block 5a which linearizes the signal from the air flow meter. The signal output from the air flow meter exhibits a high sensitivity to a low flow rates and a low sensitivity to a high flow rate. Therefore, in order to convert it into a flow rate, it is necessary to use the conventional formula represented by Equation 4 or to store the relationship between the output and the flow rate as a table map in advance and to convert the output signal of the air flow meter into an actual flow rate.

$$Q = b4 \cdot V^4 + b3 \cdot V^3 + b2 \cdot V^2 b1 \cdot V + b0 \quad \text{(Equation 4)}$$

b0–b4 are constants which are empirically defined, and V represents the output of the air flow rate meter.

The actual flow rate Q is used as the current flow rate of air passing through the throttle valve 13. Theoretically, there is a delay, due to the transport of air and due to the detection lag of the air flow meter, but this delay is small and is ignored in this embodiment.

A block 5b obtains any difference between the current flow rate of air passing through the throttle valve 13 and the command for the flow rate of air passing through the throttle valve 13 obtained in the block 4 and supplies a gain to this difference to obtain a correction amount for the throttle valve opening. A block 5c adds a signal 10 from the current throttle valve opening sensor to the throttle valve opening correction amount obtained in the block 5b to determine a throttle valve position command. Further, throttle valve position control is carried out aiming at the determined throttle valve position.

A block 6 obtains throttle valve movement and air flow rate information from block 5 and $\tau$ from block 4 to calculate the air flow rate actually taken into the engine. The result is send to the block 2 and sends it to the block 2. The block 2 corrects the amount of fuel injection if necessary.

Figure 11A:
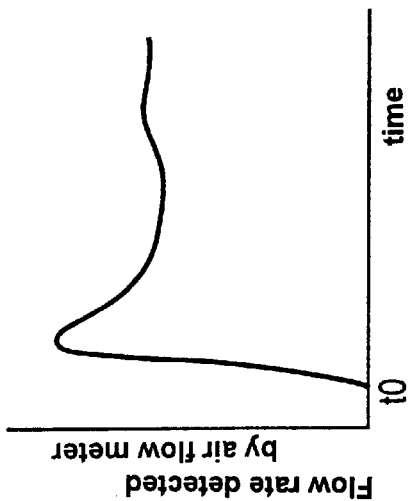
FIGS. 11($a$)–11($c$) are diagrams showing the characteristics of an engine intake air flow rate in an application of the present invention.
Figure 11B:
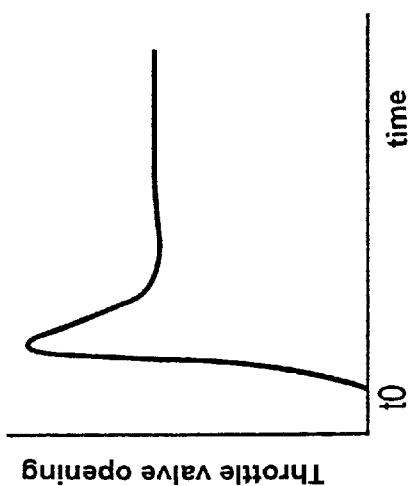

The operation of the throttle valve of this apparatus will be described using FIG. 11. In FIG. 11, the driver stepwise changes the position of the accelerator pedal and, as a result, a controller 801 issues a command for the increase in the fuel flow rate and stepwise increases in the engine intake air flow rate a point in time t0 to cause stepwise increase of engine torque. The broken line in FIG. 11(*c*) represents the engine intake air flow rate command. The engine intake air flow rate command is sent to an integrated calculating device 601 through a bus 701 to adjust the opening (position) of the throttle valve. FIG. 11(*a*) shows the throttle valve opening. The throttle valve opening operates with an over-shoot from the ultimate opening. The over-shooting amount and over-shooting time are determined by the time constant of delay. Such an operation of the throttle valve can cause near stepwise changes in the engine intake air flow rate that follow up the target as indicated by the solid line in FIG. 11(*c*). The actual engine intake air flow rate can be controlled at a high speed without the step operation by operating the throttle valve 13 in advance based on the time constant of delay if the target engine intake air flow rate is supplied.

In the above-described control method, the block 5b has obtained a correction amount for the throttle valve opening from the difference between the current flow rate of air passing through the throttle valve 13 and the command for the flow rate of air passing through the throttle valve obtained in block 4 such that the flow rate of air passing through the throttle valve 13 agrees with the signal of the air flow meter. However, since the throttle valve opening and the flow rate are in a non-linear relationship and the non-linearity is significant especially at low flow rates, this method can take time to converge. The following method is adopted in place of the block 5 to control the throttle valve opening at a higher speed and with higher accuracy.

For this purpose, a technique is used in which the current pressure in the intake pipe (the pressure in the intake pipe between the throttle valve and the engine) is first estimated and a throttle valve opening that achieves a target flow rate of air passing through the throttle valve is predicted.

Figure 4:
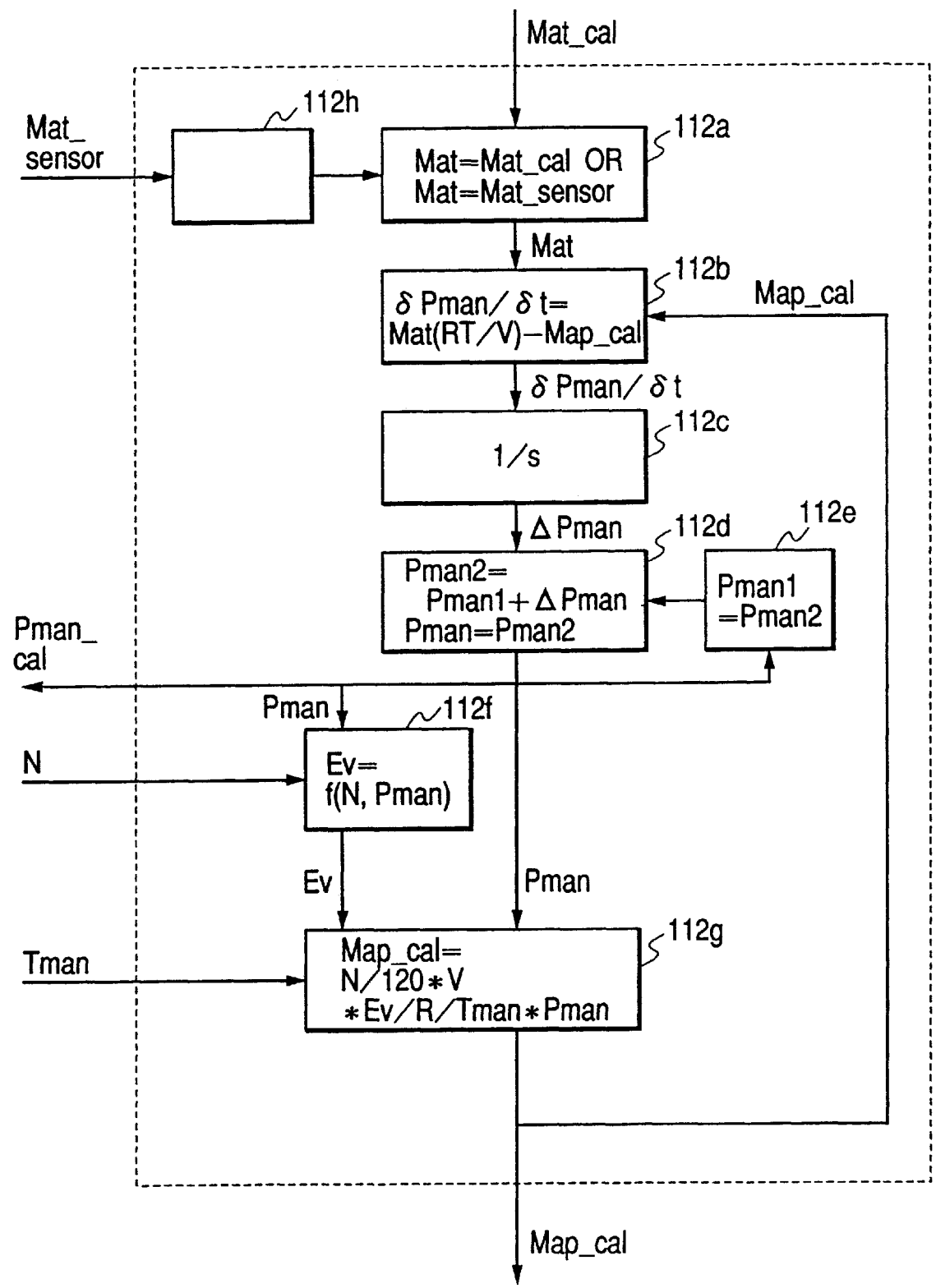
FIG. 4 is a diagram showing a method for obtaining the pressure inside a suction pipe with improved accuracy.

FIG. 4 shows a method for finding the pressure in the intake pipe. The output of the air flow meter (with a symbol "Mat_sensor) is used as the input. A block 112h converts the output of the air flow meter into a flow rate using Equation 4 or a table map. A block 112a makes a selection on which of a value calculated in a block 111h and the output of the block 112h is to be used. The output of the block 112h is selected to estimate the current pressure in the intake pipe. The output of the block 112a is sent to a block 112b to calculate the rate of change of pressure of the pressure inside the intake pipe ($\partial$Pman/$\partial$t). The rate of change of the presence is calculated using Equation 5.

$$\partial\text{Pman}/\partial t = \text{Mat}(RT/V) - \text{Map\_cal} \quad \text{(Equation 5)}$$

Pman represents the pressure inside the intake pipe; t represents time; Mat represents the flow rate of air passing through the throttle valve; R represents a gas constant; V represents the volume between the throttle and engine; and Map_cal represents the engine intake air flow rate. The result is subjected to time integration in a block 112c to calculate the change of pressure ΔPman. A block 112d obtains the sum of the change of pressure ΔPman and a previous calculated value Pman1 and newly stores it as Pman2. Pman2 is stored in a block 112e to be used for the next calculation in the block 112e. The output of the block 112d is sent to a block 112g for calculating the engine intake air flow rate and a block 112f for calculating a coefficient. The block 122f also receives the engine speed information N at the same time to calculate a coefficient Ev.

The coefficient Ev varies depending on the engine speed (N) and can be approximated using a quadratic of N expressed by Equation 6.

$$Ev(N)=e2 \cdot N^2+e1 \cdot N+e0 \qquad \text{(Equation 6)}$$

e0–e2 are constants which are empirically defined.

When it is desired to reduce the burden on the calculating device, Ev may be stored as a table map of N to allow reference to Ev(N).

The coefficient Ev is sent to the block 112g for calculating the engine intake air flow rate (Map_cal). In the block 112g, Equation 7 is calculated.

$$Map\_cal=N/120*V*Ev/R/Tman*Pman \qquad \text{(Equation 7)}$$

Tman represents the temperature of the air inside the intake pipe. The temperature of the air inside the intake pipe may be similar to the ambient air temperature and is sent by the bus 701. The result of the block 112g is sent to the block 112b for calculating the change of pressure to be used for the next calculation.

The pressure inside the intake pipe Pman obtained in the block 112d is used for the calculation of the flow rate of air passing through the throttle valve.

Figure 5:
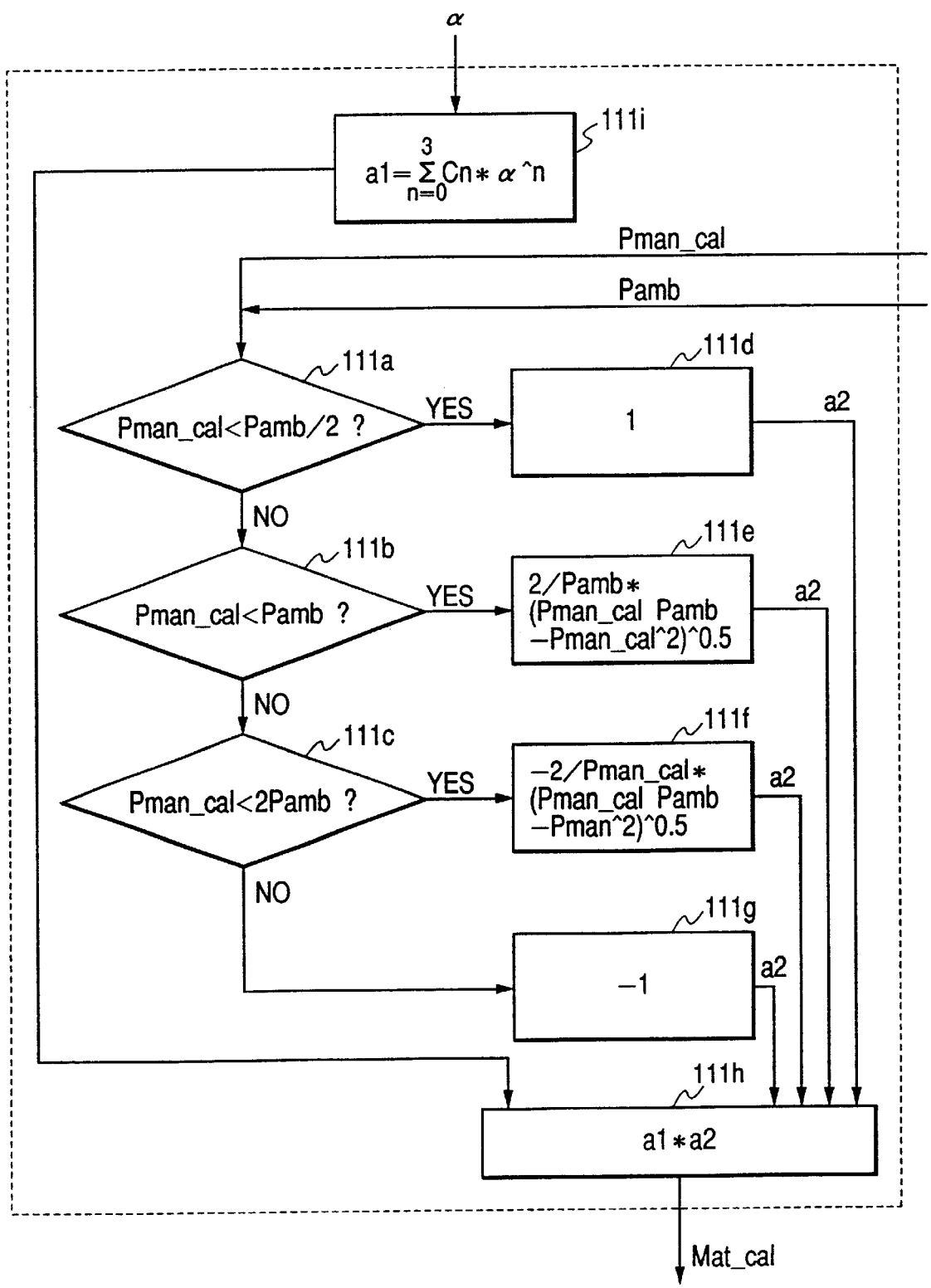
FIG. 5 is a diagram showing a method for obtaining a flow rate of air passing through a throttle valve with improved accuracy.

FIG. 5 shows a method for calculating the flow rate of air passing through the throttle valve.

The flow rate of air passing through the throttle valve not only depends on the throttle valve opening (α) but also varies depending on the pressure inside the intake pipe Pman and the atmospheric pressure Pamb. A method is adopted here in which the flow rate of air passing through the throttle valve is obtained by multiplying a flow rate obtained from α by a coefficient determined by Pman and Pamb. When the throttle valve opening α is input, a block 111i calculates a flow rate a1 as a cubic algebraic expression of α and sends it to a calculation portion 111h. The coefficients c0, c1, c2, c3 of the cubic algebraic expression are empirically defined and are input in advance. Referring to the manifold pressure Pman_cal and the atmospheric pressure Pamb, the magnitudes of them are compared in comparison portions 111a–111c; a coefficient 1 is obtained when the manifold pressure Pman is smaller than ½ of the atmospheric pressure Pamb; the coefficient is calculated according to a coefficient calculating portion 111e when it is equal to greater than the same and smaller than Pamb; the coefficient is determined by a coefficient calculating portion 111f when the manifold pressure Pman is smaller than twice the atmospheric pressure and is determined by a coefficient calculating portion 111g when greater than twice the atmospheric pressure; and the result is sent to the calculating portion 111h. As the atmospheric pressure Pamb, Pman_cal is stored when the throttle is fully opened, and the value is used. The calculating portion 111h obtains the product of the coefficient a1 according to the position of the throttle valve and the coefficient a2 of the 111d–111g to calculate the flow rate of air passing through the throttle valve Mat_cal. To reduce the burden on the calculating device, a table map may be used to which the pressure inside the intake pipe, the atmospheric pressure and the throttle valve opening are input and which refers to the flow rate of air passing through the throttle valve.

While the resultant flow rate of air passing through the throttle valve Mat_cal is acceptable if it agrees with the command for the flow rate of air passing through the throttle valve obtained in the block 4, if they do not agree, the throttle valve opening α input to the block 111a is virtually varied to carry out calculations in the blocks 111a–h to identify the throttle valve opening α with which Mat_cal becomes closest.

To obtain a flow rate of air passing through the throttle valve Mat_cal with improved accuracy, Mat_cal may be selected in the block 112a (FIG. 4) after the calculations in the blocks 111a–i to calculate the blocks 112b–g and the pressure inside the suction pipe Pman_cal may be calculated in the blocks 111a–h in FIG. 2 again to obtain the flow rate of air passing through the throttle valve Mat_cal. In this case, while the current engine speed 113 may be used as the engine speed information N used in the block 112f, it is better to pay attention to fluctuation of the engine speed in order to calculate a coefficient Ev more accurately.

Figure 6:
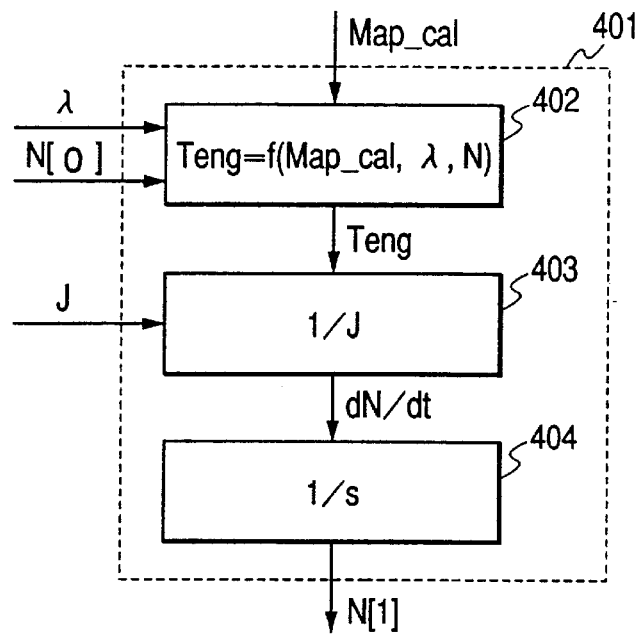
FIG. 6 is a diagram showing a method for predicting a change in an engine speed.

For this purpose, the calculation for predicting the engine speed shown in FIG. 6 is used. First, a block 402 predicts the engine torque. The result of the engine intake air flow rate Map_cal obtained in the block 112g, a target air fuel ratio λ and the current engine speed (the symbol N[0] in FIG. 6) are used for this purpose. The target air fuel ratio λ is a constant value or is set by obtaining information from the control portion for determining the amount of fuel injection. Engine torque Teng is calculated using a table map whose parameters are three variables, i.e., λ, N[0] and Map_cal.

Next, the result of the engine torque Teng obtained in the block 402 is multiplied by the inverse number of the inertia J. The inertia J is supplied by a control portion that monitors the state of the gear ratio of the vehicle because it varies depending on the gear ratio of the driving and transmission mechanism of the vehicle which is not shown. More conveniently, the inertia J may be set as an empirically obtained constant value, although the accuracy is reduced. The result will correspond to the change in angular velocity of the engine. It can be subjected to time integration to obtain the engine speed, thereby making it possible to predict the engine speed at the time of a change in the throttle valve opening α.

This makes it possible to predict the flow rate of air passing through the throttle valve at the time of a change in the throttle valve opening α and to cause the throttle valve position to follow up a command for the flow rate of air passing through the throttle valve with accuracy and at a high speed.

According to the above-described method of control, while the air flow meter 7, electronically controlled throttle 8 and calculating device 14 may be separately provided as shown in FIG. 1 above, they may be integrated. Especially, when the air flow meter 7 and the throttle valve are close to each other, the air flow meter 7 can detect the flow rate of air passing through the throttle valve without delay to improve the present method of control further. Further, by integrating also the calculating device, the connection between the calculating device 14, air flow meter 7 and electronically controlled throttle 8 is simplified.

Figure 7:
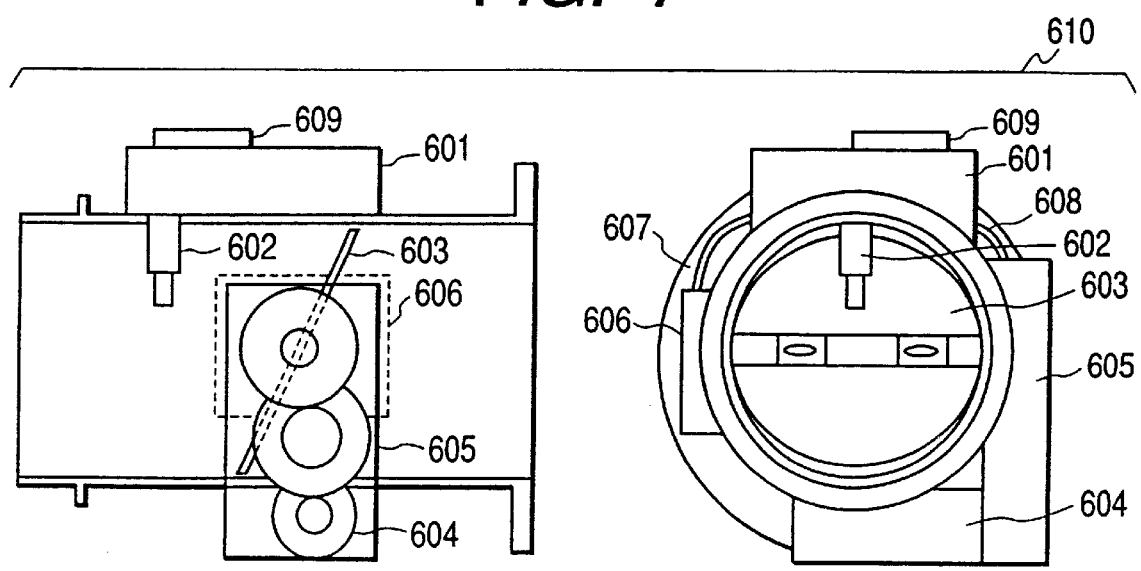
FIG. 7 is a view of an integrated apparatus.

FIG. 7 shows an apparatus in which an air flow meter, an electronically controlled throttle and a calculating device are integrated (hereinafter "integrated apparatus"). The integrated apparatus 610 is constituted by a calculating device 601, an air flow rate meter 602 connected thereto, a throttle valve 603, an electric motor 604 for driving the throttle valve, a driving portion 605 incorporating a train of gears and a spring mechanism for transferring the driving force of the motor 604 and a throttle position sensor 606 for detecting the opening of the throttle valve, and the throttle position sensor 606 and the electric motor 604 are connected to the calculating device 601 through a cable 607 and a cable 608, respectively. The cable 607 sends a signal from the sensor 606 to the calculating device 601. A signal for driving the electric motor 604 is sent from the calculating device 601. Further, a connector 609 is provided to allow the calculating device 601 to communicate with the outside.

Figure 8:
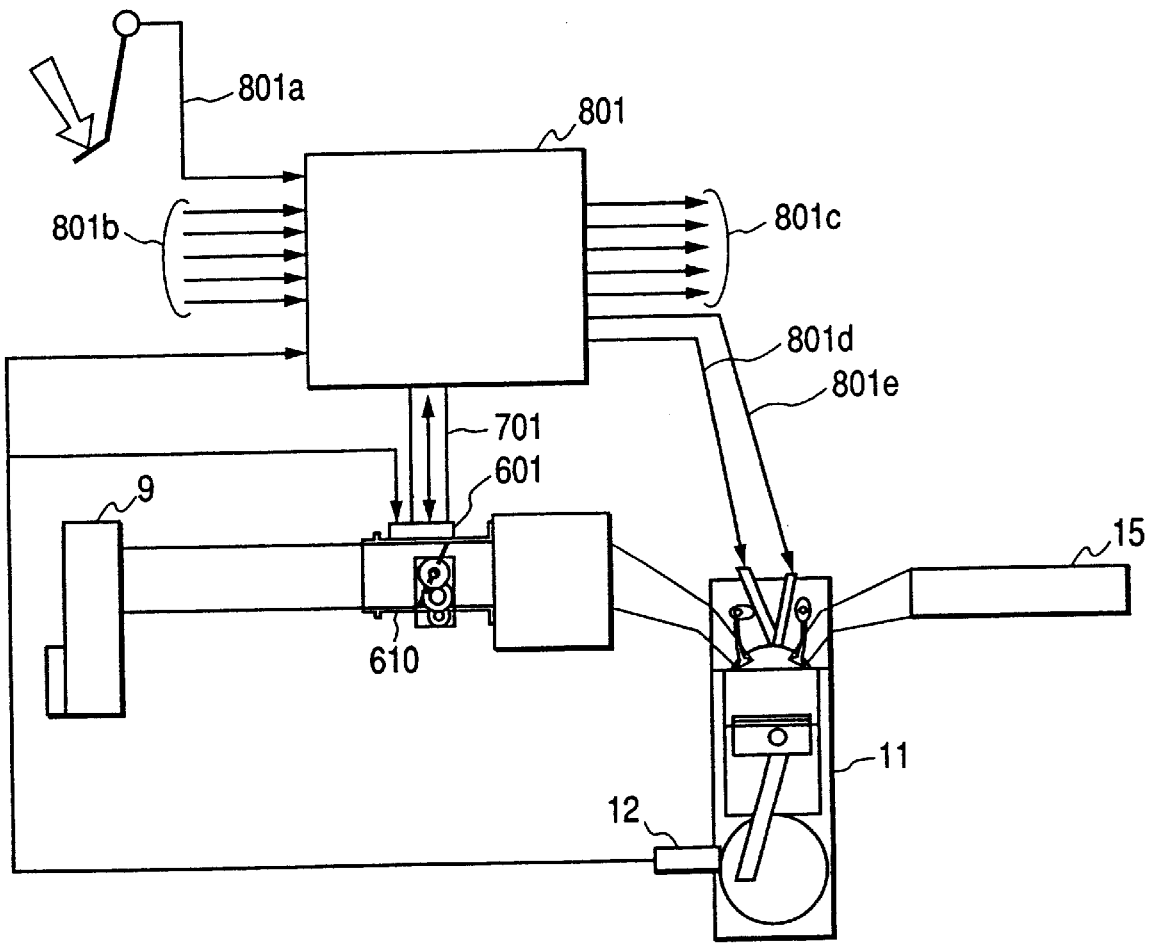
FIG. 8 is a view of an integrated apparatus mounted on an engine.

FIG. 8 shows a state in which the apparatus of the invention is mounted on an engine. The integrated apparatus 610 is mounted on a suction pipe of an engine 802 and is connected to a controller 801 which controls the vehicle as a whole including the engine by a signal line. Position information 801a of an acceleration pedal which is stepped on by a driver and other information 801b on the vehicle is input to the controller 801 which outputs a signal 801c for various actuators, a signal 801d to a fuel injection injector and an ignition signal 801e. In the controller 801, torque (FIG. 1, block 1) and the amount of fuel injection required for the engine are calculated (FIG. 1, block 2), and an engine intake air flow rate command is calculated (FIG. 1, block 3).

Engine speed information and the engine intake air flow rate command are sent from the controller 801 through the connector 609 of the integrated apparatus 610 by a bus 701. The calculating device 601 of the integrated apparatus performs delay compensation (FIG. 1, block 4), throttle valve control (FIG. 1, block 5) and the calculation of the current engine intake air flow rate (FIG. 1, block 6) such that the actual engine intake air flow rate follows up the engine intake air flow rate command.

By separating the calculating device 601 and the controller 801 in such a manner, it is possible to reduce the calculation load on the controller 801 that controls the engine as a whole. Further, even when there is a modification of the engine accompanied by modifications of the electronically controlled throttle and air flow rate meter, since only the engine intake air flow rate is specified, the controller 801 can be shared between different engines to provide the effect of cost reduction. Further, since the integrated apparatus 610 only causes the throttle valve based on a command on the engine intake air flow rate, it can be also shared because modifications on the intake system and engine only result in a need for changes in internal coefficients. In the case of separate bodies, each of experimental constants and maps must be changed each time in consideration to the characteristics of the air flow rate meter and electronically controlled throttle, which has resulted in a high cost.

Figure 9:
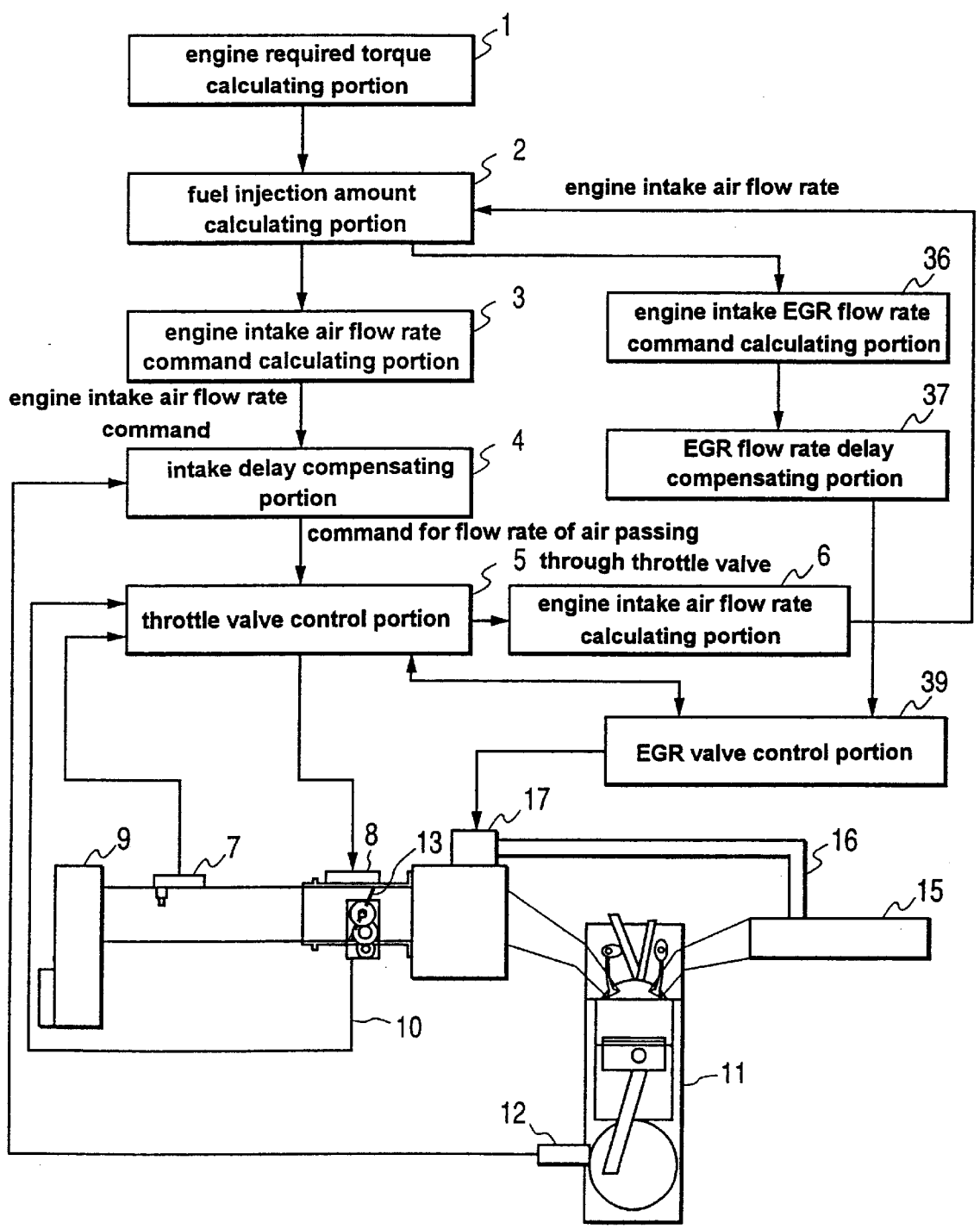
FIG. 9 is a diagram showing an embodiment in which the present invention is applied to an engine with an EGR device.

As another embodiment (second embodiment), a description will now be made on a method of control in which desirable amounts of air and exhaust gas are introduced into an engine having an exhaust gas recirculation valve (EGR valve) to perform exhaust gas recirculation (EGR: Exhaust Gas Recirculation). FIG. 9 shows the method of control. Exhaust gas is introduced from an exhaust pipe 15 through an EGR pipe 16 and an EGR valve 17 into a suction pipe. The amount of the introduced exhaust gas is controlled by the EGR valve 17.

A block 1 calculates toque required for the engine by an operation of a driver on an acceleration pedal or the like. A block 2 determines the amount of fuel injection. A block 3 calculates the engine intake air flow rate and a block 36 calculates an engine intake EGR flow rate to output an engine intake air flow rate command and an engine intake EGR flow rate command, respectively. A block 4 calculates the engine speed of the engine 11 obtained by a crank angle sensor 12 and determines a time constant for delay of the engine intake air flow rate relative to the flow rate of air passing through the throttle valve based on the engine speed. Once the time constant of delay is determined, it is possible to compensate for a delay using an inverse function of a transfer function representing a change in the intake air flow rate of the engine from a change in the throttle valve opening. That is, a flow rate of air passing through the throttle valve required to reach the engine intake air flow rate command is calculated.

A block 5 calculates a throttle valve opening to achieve the flow rate of air passing through the throttle valve calculated in the block 4 using a signal output by an air flow meter 7, a throttle valve opening signal 10 and the opening of the EGR valve obtained in the block 5. Further, the opening of the electronically controlled throttle is controlled such that the calculated throttle valve opening is achieved.

A block 6 succeeds the information input to the block 5 and calculates the actual flow rate of the air taken into the engine and sends it to a block 2. The block 2 corrects the amount of fuel injection with the information in the block 5.

A block 37 determines a time constant of delay of the engine intake EGR flow rate relative to the flow rate of exhaust gas passing through the EGR valve based on the time constant of delay in the block 4. Once the time constant of delay is determined, it is possible to compensate for a delay using an inverse transfer function of a transfer function representing a change in the intake EGR flow rate of the engine from a change in the EGR valve opening. That is, an EGR flow rate passing through the EGR valve required to reach the engine intake EGR flow rate command is calculated.

A block 39 adjusts the opening of the EGR valve such that the EGR flow rate passing through the EGR valve is achieved.

Figure 10A:
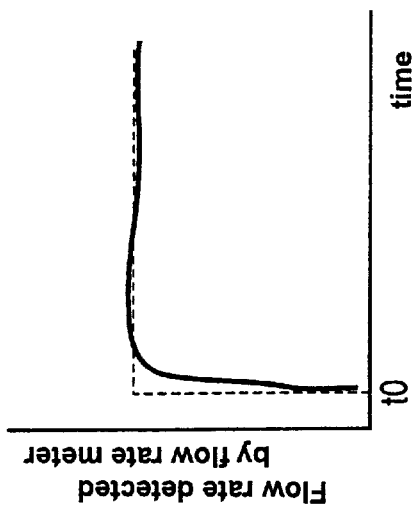
FIGS. 10($a$)–10($c$) are illustrations of a delay in the flow rate of the air taken into an engine.
Figure 10B:
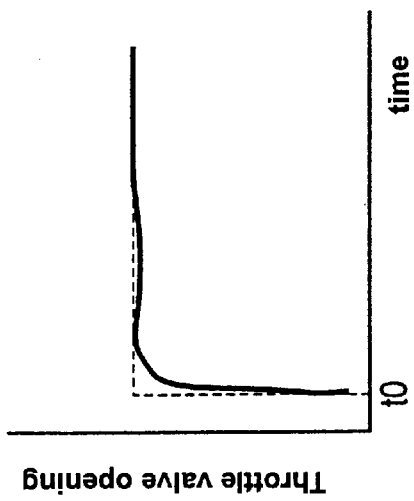
Figure 10C:
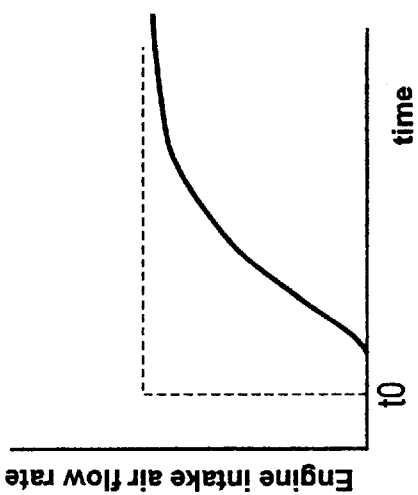

A description will now be made using FIG. 10 and FIG. 11 on a delay of an engine intake air flow rate flowing into the cylinders of an engine in relation to the first embodiment and second embodiment. A case is shown here in which the engine speed is constant. In FIG. 10, FIG. 10(a) shows the opening of a throttle valve provided upstream of the intake side of the engine. The opening of the throttle valve is stepwise operated at a point in time t0. FIG. 10(b) shows a flow rate detected by an air flow rate meter provided upstream of the throttle valve at the same point in time. It is observed from a comparison between FIGS. 10(a), (b) that a delay occurs in (b) in which slight over-shoot is also seen. FIG. 10(c) shows the engine intake air flow rate taken into the cylinders of the engine. The solid line indicates an actual engine intake air flow rate, and the broken line indicates a flow rate in accordance with the opening of the throttle valve as a reference.

In FIG. 10(c), the engine intake air flow rate slowly increases. This is attributable to the volume of the intake pipe between the throttle valve and the engine. Since it takes time for the volume to be filled, an abrupt change in the throttle valve causes no abrupt change in the engine intake air flow rate. That is, the greater the capacity, the greater the delay. Further, the engine intake air flow rate is also delayed from the output of the air flow rate meter in FIG. 10(b). The engine intake air flow rate is delayed from the operation of the throttle valve.

Under such circumstances, according to conventional techniques, the delay of the engine intake air flow rate in response to an abrupt change in the throttle valve opening has been calculated to adjust the amount of fuel injection. The present invention provides an apparatus and method for correcting the delay of the engine intake air flow rate itself.

The operation will be described with reference to a case as an example in which the torque of an engine is increased stepwise as a result of abrupt stepping of the driver on the acceleration pedal or because of the running state of the vehicle. The required torque for the engine is first determined, and an amount of fuel injection is determined based on the same. After a target engine intake air flow rate to maintain an optimum air fuel ratio is determined, a calculation is then carried out to obtain a time constant for the delay of the engine intake air flow rate relative to the movement of the throttle valve from the engine speed. The throttle valve operates to compensate for the delay based on the calculated delay time constant. In other words, a target flow rate of air passing through the throttle valve is obtained from the engine intake air flow rate using a transfer function (transfer function to compensate for a delay) having characteristics that are the inverse of those of a transfer function whose input is the flow rate of air passing through the throttle valve and whose output is the engine intake air flow rate (transfer function to give a delay). The throttle valve is operated using an electronically controlled throttle such that a command and an actual flow rate agree with each other by using the target flow rate of air passing through the throttle valve as the command value and by comparing it with the actual throttle valve flow rate calculated based on an air flow rate detected by the air flow meter. Further, the engine intake air flow rate is estimated using the flow rate of air passing through the throttle valve and the time constant of delay, and the result is returned to a calculating portion for determining the amount of fuel injection to correct the amount of fuel injection if necessary.

Figure 11C:
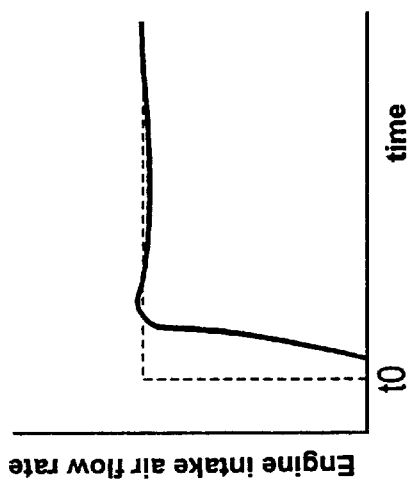
Figure 12A:
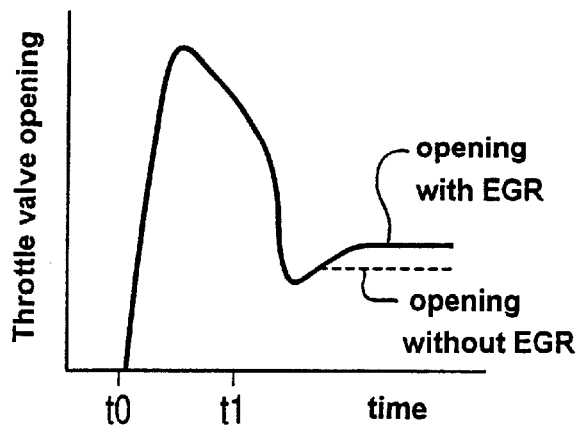
FIGS. 12($a$)–12($d$) are diagrams showing the characteristics of an engine intake air flow rate in an application of the present invention to an engine with an EGR.
Figure 12B:
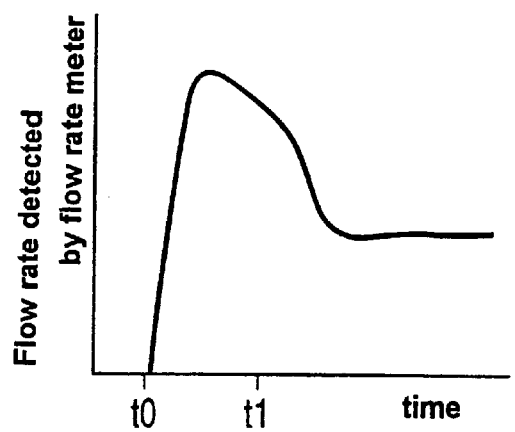
Figure 12C:
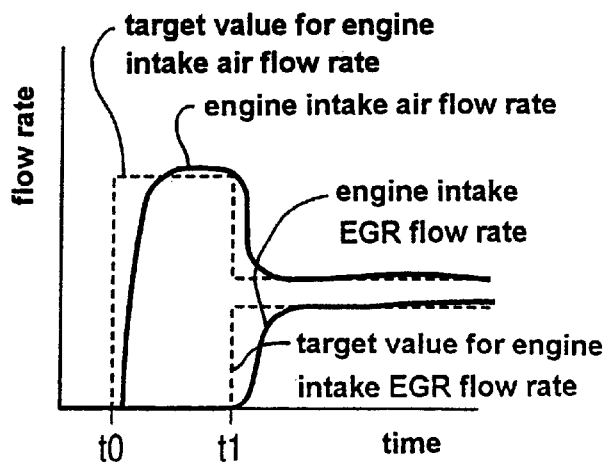
Figure 12D:
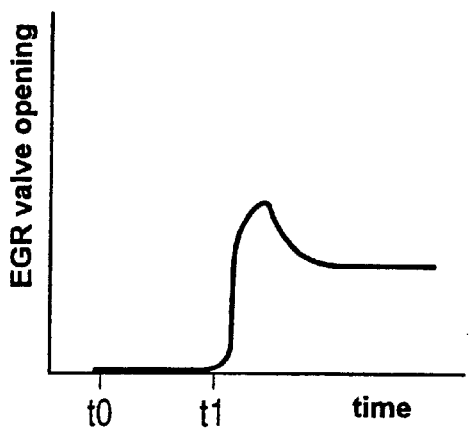

The operation of the throttle valve will now be described using FIG. 11. The broken line in FIG. 11(c) is the target engine intake air flow rate. It is varied stepwise at a point in time t0. The calculating device obtains the time constant of delay from the engine speed and causes the throttle valve taking the factor of the time constant of delay into account such that the engine intake air flow rate varies stepwise. As shown in FIG. 11(a), the throttle valve operates with an over-shoot from the ultimate opening. The over-shooting amount and over-shooting time are determined by the time constant of delay. Such an operation of the throttle valve can cause stepwise changes in the engine intake air flow rate that follow up the target as indicated by the solid line in FIG. 11(c). The actual engine intake air flow rate can be controlled at a high speed without the step operation by operating the throttle valve 13 in advance based on the time constant of delay if the target engine intake air flow rate is supplied.

Figure 13:
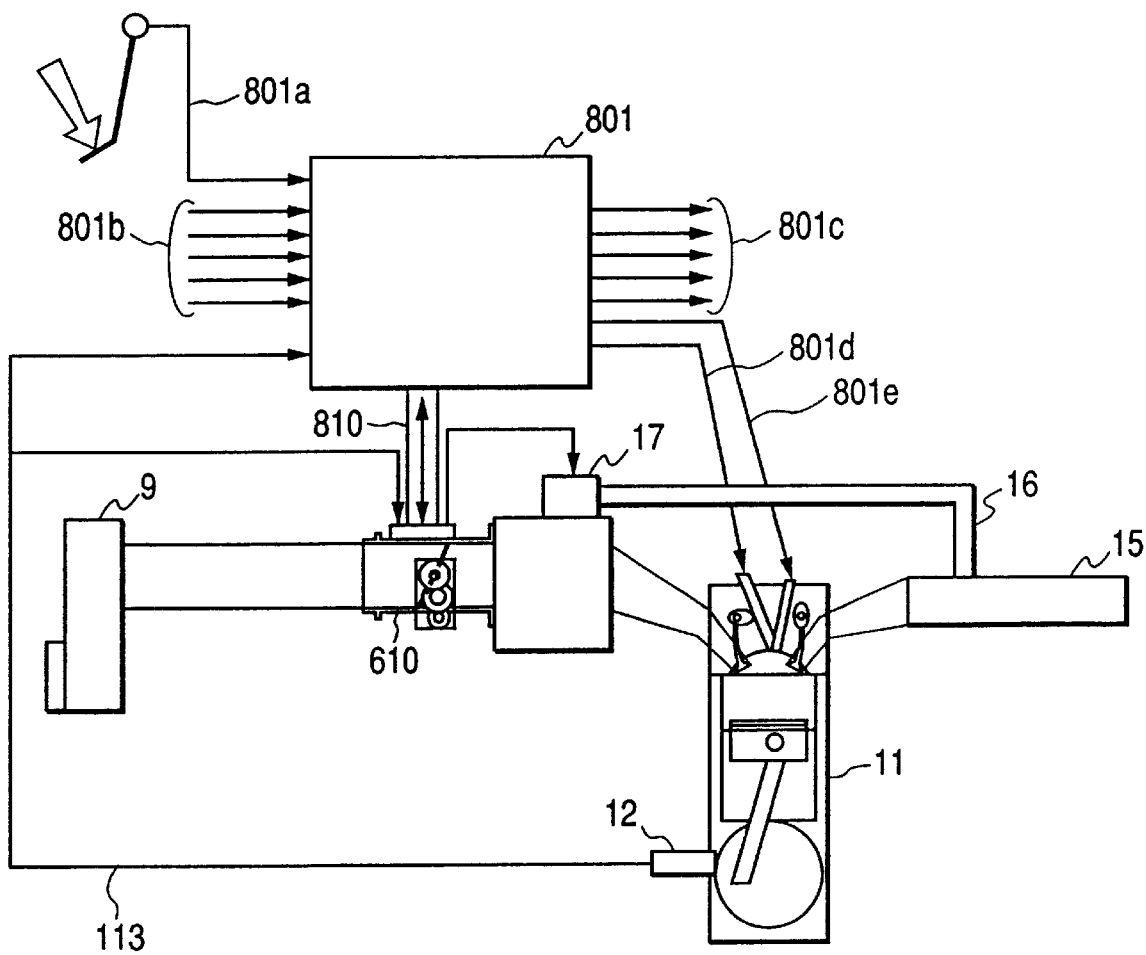
FIG. 13 is a view of an integrated apparatus mounted on an engine with an EGR.

FIG. 13 shows a state in which an apparatus that implements the above-described control method is mounted on an engine. An integrated apparatus 810 is mounted on a suction pipe of an engine 11.

An integrated apparatus 610 is connected by a controller 801 that outputs a fuel injection signal 801d and an ignition signal 801e. The integrated apparatus 610 receives the engine speed, an engine intake air flow rate command 103 and an engine intake EGR flow rate command through a bus 810. The integrated apparatus 610 is connected not only to a throttle valve integral therewith but also to an EGR valve 17 which is a separate body to control the opening of the EGR valve.

FIG. 12 shows a case wherein the engine intake air flow rate and EGR flow rate were adjusted in the above-described configuration. As indicated by the broken line in FIG. 12c, an example is shown in which an engine intake air flow rate was given as a target value at a point in time t0 and in which an engine intake EGR flow rate was then given stepwise at a point in time t1 such that the total flow rate flowing into the engine (EGR flow rate+air flow rate) would not change. As indicated by the solid line in FIG. 12(c), the engine intake air flow rate and EGR flow rate changed in accordance with the target values. At this time, the throttle valve opening changes as shown in FIG. 12(a). It temporarily opens wide between the points in time t0 and t1 to correct a delay of response attributable to the manifold. It temporarily operates toward closing side at the point in time t1 to reduce the engine intake air flow rate abruptly. Thereafter, the throttle valve is positioned toward the opening side compared to a case wherein no EGR is provided because of an increase in the pressure inside the manifold as a result of the introduction of an EGR. On the other hand, the flow rate detected by the air flow meter exhibits substantially the same flow rate pattern whether there is an EGR or not. This is because the present method of control causes the throttle valve to operate based on the flow rate of air taken into the engine as a reference instead of simply driving the signal of the air flow rate meter to a target value. FIG. 12(d) shows the opening of the EGR valve. At the point in time t1 and afterward, the EGR valve starts an opening operation and operates to cause a temporary large opening to compensate for a delay in the filling of the manifold. This is because the present method of control causes the EGR valve to operate based on the EGR flow rate taken into the engine as a reference.

While the above embodiments have been described primarily with reference to DI engines, they may be applied to cases wherein a conventional MPI engine is used on a fuel-first basis or to dilute mixture combustion engines (lean burn engines) and the like.

Further, since the engine intake air flow rate is always calculated, it may be easily used for detecting failures of an air flow meter and an air fuel ratio sensor by comparing it with the detection values of the air fuel ratio sensor measuring an air fuel ratio from components in exhaust gas and the air flow meter.

What is claimed is:

1. A device for controlling the flow of intake air to an engine, comprising:
    an electronically controlled throttle, including a throttle valve, provided in a suction pipe for introducing air into the engine;
    an air flow meter to detect the air flow which flows in the suction pipe;
    an electron motor to drive the throttle valve; and
    a mechanism, including a gear, which transfers driving force of the motor to the throttle valve;
    wherein said air flow meter and said electric motor are arranged on opposite respective sides of a plane that includes an axis of the throttle valve and that extends in a direction of the flow of intake air in the engine.

2. A device according to claim 1, wherein said electric motor is arranged at a portion where its drive shaft is parallel to an axis of said throttle valve.

3. A device according to claim 2, wherein said air flow meter is inserted into the suction pipe perpendicularly with respect to the drive shaft and the axis of said throttle valve from an opening formed on the suction pipe.

* * * * *